United States Patent [19]

Ishida

[11] Patent Number: 4,916,300
[45] Date of Patent: Apr. 10, 1990

[54] OPTICALLY READABLE/WRITABLE CARD

[75] Inventor: Takeshi Ishida, Takatsuki, Japan

[73] Assignee: Omron Tateisi Electronics Co., Kyoto, Japan

[21] Appl. No.: 372,114

[22] Filed: Jun. 28, 1989

Related U.S. Application Data

[63] Continuation of Ser. No. 37,535, Apr. 13, 1987, abandoned.

[30] Foreign Application Priority Data

Apr. 15, 1986 [JP] Japan .............................. 61-57165[U]

[51] Int. Cl.$^4$ .............................................. G06K 19/00
[52] U.S. Cl. ................................. 235/487; 235/454; 235/488; 369/283
[58] Field of Search .................... 235/454, 487, 488

[56] References Cited

U.S. PATENT DOCUMENTS 4,340,959  7/1982  Levin .......................... 369/284 X
4,754,128  6/1988  Takeda et al. ..................... 235/488

FOREIGN PATENT DOCUMENTS 0185239  6/1986  European Pat. Off. .
8608201  7/1986  Fed. Rep. of Germany .

OTHER PUBLICATIONS

Patent Abstracts of Japan, vol. 9, No. 127 (P-360) (1850), May 31, 1985; JP A 60 008 993 (Fujitsu K.K.) 1/17/85.

Primary Examiner—David L. Trafton
Attorney, Agent, or Firm—Stevens, Davis, Miller & Mosher

[57] ABSTRACT

An optically readable/writable card has such a structure that a transparent protection layer is laminated so as to cover a recording medium layer on a card substrate. A recess portion is formed in the transparent protection layer at the position over the recording medium layer. The flat bottom surface of the recess portion is located lower than the card surface. With this recess portion, the transparent protection layer over the recording medium layer is protected from scratches because it is difficult to be come into contact with the card casing or the like, so that the recorded information can be accurately certainly read out or written.

2 Claims, 1 Drawing Sheet

OPTICALLY READABLE/WRITABLE CARD

This application is a continuing application of Ser. No. 037,535, filed Apr. 13, 1987 now abandoned.

BACKGROUND OF THE INVENTION

The present invention relates to an optically readable card, an optically writable card, or an optically readable and writable card (hereinafter, these cards are generally referred to as an optically readable/writable card or, simply, an optical card). The term "optical/optically" also incorporates the concept of "magnetooptic/magnetooptically".

The optical card has a structure such that a recording medium layer is arranged on a part or all of the upper surface of a card substrate and a transparent protection layer made of a transparent plastic material is laminated on the card substrate and recording medium layer so as to cover the recording medium layer.

Predetermined data is represented and recorded as forms of positions, sizes, or the like of a number of pits formed on the recording medium layer. A laser beam is focused so as to have a diameter of about 1 μm and then irradiated onto the recording medium layer. The reflected lights are received by a sensor. The data is read out using of the principle such that the intensity of reflected lights is modulated by the existence of the pits. In this manner, the purely optically readable card is constituted.

The recording principle of the magnetooptically writable/readable card is as follows. The light is irradiated onto the recording medium layer to thereby locally increase the temperature thereof and at the same time, the magnetism is applied to the recording medium layer from the outside to thereby change the direction of the magnetization of the local portion. By focusing the laser beam, a temperature of the fairly small area having a diameter of about 1 μm can be raised, so that the high density recording can be performed. In general, the magnetic field necessary for the magnetic recording decreases with an increase in temperature of the recording medium; therefore, data can be recorded even by an extremely weak magnetic field.

At present, two kinds of recording and erasing methods are considered. One is a magnetic field modulation method whereby a laser beam is always irradiated onto the recording medium and the magnetic field to be applied is changed in accordance with the data to be recorded. The other is the optical modulation method whereby a DC magnetic field is always applied and a laser beam to be irradiated is allowed to flicker in accordance with the data to be recorded.

The optical reading method includes the direct optical playing-back method and the indirect optical playing-back method. The former method uses the principle such that when a linearly polarized light is directly irradiated to the recording position, the polarizing direction of the reflected lights (or transmitted light) rotates due to the magnetooptic effect. According to the latter method, after a recording pattern was transferred onto a thin magnetic film, it is read out with the light.

In such an optical card, since the recorded information is read out or written by the optical method, if the surface of the transparent protection layer is scratched, there is a fear such that it is difficult to read out the recorded information from the recording medium layer or the recorded information is erroneously read out or the like.

If the optical card is used as such a conventional magnetic card that it is always carried and frequently pulled out from and put into a card casing, the surface of the card will be soon scratched or the like. Consequently, there is a limitation when the optical card is used in a wide application field such as in the magnetic card.

SUMMARY OF THE INVENTION

It is an object of the present invention to provide an optical card in which the portion of the transparent protection layer positioned on the recording medium layer has such a structure that scratches are hardly caused, thereby enabling the recorded information to be accurately certainly read out or the information to be accurately written and thereby widening the application field of the optical card.

According to the optical card of the present invention, a recording medium layer is formed on a part of a card substrate and a transparent protection layer is further laminated on the recording medium layer and card substrate so as to cover the recording medium layer, wherein a recess portion is formed in the transparent protection layer at the position corresponding to the recording medium layer, and the bottom surface of the recess portion is located lower than the surface of the card.

With this constitution, even if the optical card of the invention is always carried and used so as to be frequently pulled out from and put into the card casing, the bottom surface portion of the recess portion of the transparent protection layer is located behind the card surface and is difficult to be come into contact with the casing or the like. Therefore, the ratio of the occurrence of scratches or the like in this poriton fairly decreases and the recorded information can be accurately certainly read out or written. Thus, such a fear that it is difficult to read out the recorded information due to the scratches formed in the portion of the transparent protection layer over the recording medium layer or the recorded information is erroneously read out or the like is substantially eliminated. The optical card can be used in the wide application field such as in the magnetic cards.

DETAILED DESCRIPTION OF THE PREFERRED EMBODIMENTS

Figure 1:
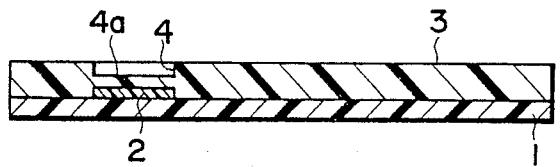
FIG. 1 is a cross sectional view of an optical card according to an embodiment of the present invention.

FIG. 1 shows an optical card according to an embodiment of the present invention. The optical card shown in the diagram as an example has such a structure that a recording medium layer 2 is formed on a part of a card substrate 1 made of a plastic material and a transparent protection layer 3 made of a transparent plastic material is laminated on the recording medium layer 2 and card substrate 1 so as to cover the recording medium layer 2. The recording medium layer 2 is used as the portion in which predetermined card information is recorded by the foregoing optical method or the like. The transparent protection layer 3 is provided to protect the recording medium layer 2 from the external force or the like.

A recess portion 4 is formed stepwise in the surface of the transparent protection layer 3 at the position over the recording medium layer 2. A flat bottom surface 4a of the stairway recess portion 4 is located lower than the upper surface of the transparent protection layer 3.

Figure 2:
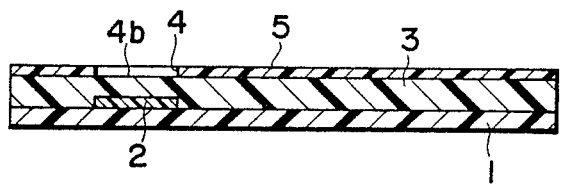
FIG. 2 is a cross sectional view showing another embodiment of the invention.

The stairway recess portion 4 shown in the diagram as an example is formed by working the upper surface of the transparent protection layer 3 so as to dent the position corresponding to the recording medium layer 2. However, the stairway recess portion is not limited to this method but may be also formed as shown in, e.g., FIG. 2; namely, a transparent seal material 5 is adhered to the upper surface of the transparent protection layer 3 excluding the position corresponding to the recording medium layer 2.

The recording medium layer 2 may be formed by the card substrate 1 itself or may be formed integrally therewith.

When the optical card shown in FIG. 1 is pulled out from and put into, e.g., the card casing or the like, the portion of the bottom surface 4a of the stairway recess portion 4 of the transparent protection layer 3 is located lower than the card surface and is difficult to be come into contact with the casing or the like. Therefore, the ratio of the occurrence of scratches or the like in this portion fairly decreases. On the other hand, in the case of the optical card shown in FIG. 2, a bottom surface 4b (which is the surface of the transparent protection layer 3) of the stairway recess portion 4 is located lower than the upper surface of the transparent seal material 5, so that the occurrence of scratches can be also similarly prevented.

Accordingly, when the recorded information is read out by irradiating a laser beam onto the recording medium layer 2 or when the recorded information is magnetooptically read out or written, such a fear that it is difficult to read out or write the information from the recording medium layer 2 due to the irregular reflection or scattering of the lights due to the scratches or the like or the recorded information is erroneously read out or the information is erroneously written is prevented. The recorded information can be accurately certainly read out or written.

What is claimed is:

1. An optically readable/writable card comprising a card substrate, a recording medium layer on said card substrate, a transparent protection layer laminated to cover said recording medium layer, said transparent protection layer being formed with a recess portion at a position corresponding to said recording medium layer, and the bottom surface of said recess portion being located lower than the surface of the card, said recess portion being formed by a depression in an upper surface of said transparent protection layer at the position corresponding to said recording medium layer.

2. An optically readable/writable card comprising a card substrate, a recording medium layer on said card substrate, a transparent protection layer laminated to cover said recording medium layer, said transparent protection layer being formed with a recess portion at a position corresponding to said recording medium layer, and the bottom surface of said recess portion being located lower than the surface of the card, said transparent protection layer comprising a first layer covering said recording medium layer and a second transparent seal material layer adhered onto a portion of the upper surface of said first layer, said recess portion being formed by said second transparent seal material layer being adhered onto said upper surface of said first layer except at the position corresponding to said recording medium layer.

* * * * *